Feb. 16, 1932.   L. A. UMANSKY   1,845,770
SYNCHRONOUS MOTOR
Filed April 24, 1928
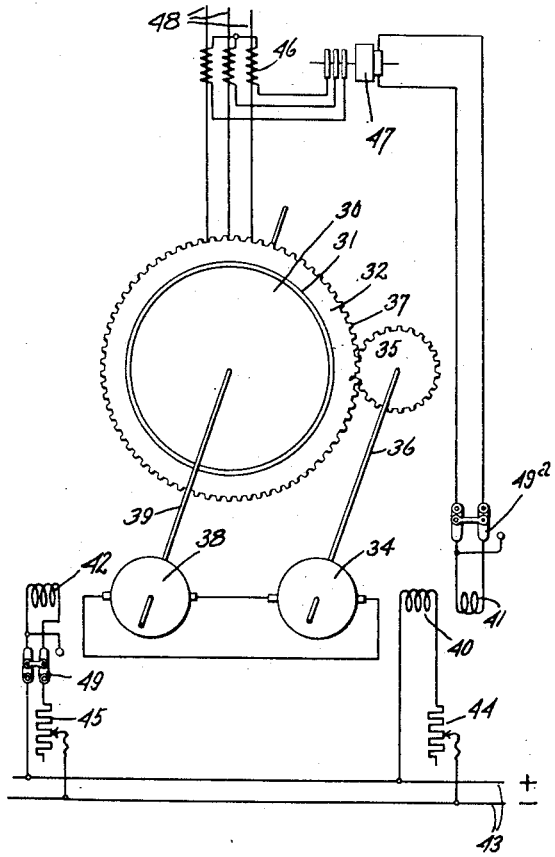
Inventor:
Leonid A. Umansky,
by Charles E. Mullan
    His Attorney.

Patented Feb. 16, 1932

1,845,770

UNITED STATES PATENT OFFICE

LEONID A. UMANSKY, OF SCHENECTADY, NEW YORK, ASSIGNOR TO GENERAL ELECTRIC COMPANY, A CORPORATION OF NEW YORK

SYNCHRONOUS MOTOR

Application filed April 24, 1928. Serial No. 272,484.

My invention relates to synchronous alternating current motors, and more particularly to the regulation of their speed characteristics so as to have in addition to the customary advantages of synchronous motors, certain advantageous characteristics of the asynchronous type of alternating current motors.

Because of the power factor corrective characteristics of synchronous motors, this type of motor is being used extensively in places where heretofore the asynchronous type of motor such as the customary induction motor would ordinarily have been used. However the ordinary type of synchronous motor has definite limitations which preclude it from use for many purposes, as for example, where varying speeds are desired because of the fact that after the synchronous motor is locked in its synchronous running relation it will maintain its synchronous speed until the breakdown point when the motor will stop.

It is desirable in many instances that in addition to the advantageous characteristics of the ordinary synchronous motor that the variable speed characteristics of many types of asynchronous motors be secured. Thus, it is very desirable to operate the motor not only at its constant synchronous speed but also at constant speeds both above and below its synchronous speed. In one of its aspects my invention contemplates the provision of speed regulating means for a synchronous motor whereby it may be operated at any desirable preselected speed within wide limits both above and below synchronous speed; and further, the provision of means for controlling the speed regulating means so as to maintain the selected speed substantially constant.

In carrying my invention into effect in one form thereof, the synchronous motor is provided with a rotatable armature member as well as a rotatable field member, one of the members being arranged to be connected to a load for driving the same. By reason of the inherent characteristic of synchronous motors, the synchronous speed relation between the first and second members will always be maintained. Thus, by causing both members to rotate it is possible to regulate the absolute speed of the first member, that is the member mechanically connected to the load, and the value of its absolute speed will depend upon both the speed of the second member and its direction of rotation. I provide suitable means operably connected to the synchronous motor for regulating its speed; preferably, the speed regulating means will be arranged so as to permit the utilization of the kinetic energy of both rotating members of the motor.

In regulating the speed of the synchronous motor, I control the operably connected means so as to cause the above-mentioned second member to rotate at any desired speed within wide limits either in the same direction or in the opposite direction as the first member, whereby the synchronous motor is caused to either rotate above or below synchronous speed, as the case may be, and further regulate the connected means in response to some motor operating condition or load value, so that a very small speed regulation contingent upon load variation is possible, whereby the speed of the synchronous motor is held substantially constant at the desired set speed.

For a more complete understanding of my invention, reference should be had to the accompanying drawing in which: the single figure is a diagrammatic representation of a system of control for a synchronous motor embodying my invention.

Referring to the drawing, I have shown my invention in one form as applied to a synchronous motor having both its armature and field mounted for rotation.

As shown, the synchronous motor 30 is provided with a rotatable field member 31, and a rotatable stator member 32 constituting an armature. A dynamo electric machine 34 is geared to the stator 32 by means of a gear 35, mounted upon its shaft 36 and meshing with a gear 37 formed upon the stator periphery, and is electrically connected to a motor 38 preferably mounted upon the synchronous motor shaft 39. The machine 34 is provided with separately excited fields 40 and 41, and the machine 38 is provided with a separately excited field 42. A suitable source of direct current supply 43 is provided for the fields 40 and 42, and in order that their strengths may be varied, as desired, rheostat 44 and 45 are provided. If desired a fly-wheel may be incorporated in this structure. Thus, for example, a fly-wheel may be connected with the shaft 39; it is to be understood, however, that a fly-wheel is not indispensable.

In order that the speed of the motor may be maintained constant at any adjusted speed, the strength of the field 41 is automatically varied in response to variations in the energy input to the synchronous motor, and thus in response to variations in the load driven thereby, so that a very small speed regulation of the motor contingent upon load variation is possible. As shown, a current transformer 46 and an alternating to direct current transformer 47, shown as a synchronous converter, are inserted in the connections between a suitable source of alternating current supply 48, that is provided for the synchronous motor, and the field 41 whereby a direct current of suitable voltage is impressed upon the field. Thus, it will be observed that the strength of the field 41 is varied in response to variations in the current input to the synchronous motor. In order that the synchronous motor may be driven at speeds both above and below synchronous speed, a reversing switch 49 is provided in the circuit of the field 42 for reversing the direction of current flow therethrough whereby the machine 38 may be caused to operate either as a motor or as a generator, and a reversing switch 49a is interposed in the circuit of the field 41 whereby when it is desired to operate the machine 34 either as a generator or as a motor the current through the field may be caused to flow in the proper direction.

The operation of the above-described arrangement is as follows:

Assuming that it is desired to operate the synchronous motor 30 below synchronous speed, it is apparent that the stator 32 should rotate in a direction opposite to that of the rotor 31 and with a speed proportionate to the desired reduction in speed of the rotor. In order that the stator may thus rotate, the machine 34 is driven as a generator by the stator and the machine 38 is caused to operate as a motor deriving its electrical energy from the generator 34, the speed with which the generator is driven by the stator depending upon the strengths of the fields 40, 41, and 42 which govern the resisting torque of the generator 34. The total energy input from the source 48 is thus divided into two parts, the first part, proportional to the speed of the rotor in space, is given out as mechanical power at the rotor shaft, while the second part, proportional to the slip of the stator is available at the stator for driving the generator 34.

Under these conditions, as long as the load upon the rotor 31 remains constant, the speeds of the rotor 31 and the stator 32 remain constant, and a balanced torque relation exists between the stator and the machine 34. Should the load upon the rotor increase, the stator will tend to slip back and accelerate in this direction. Since, however, it is desired to hold the speed regulation contingent on the load within very narrow limits, that is, to maintain a substantially constant speed, it is necessary that the acceleration of the stator 32, due to the increase of load, be opposed by a suitably increased resisting torque transmitted from the machine 34. This increased torque is derived by varying the field strength 41 in response to the increased current input to the synchronous motor 30, as has been described. Thus as the field strength increases, a larger current is caused to flow through the armatures of the machines 34 and 38 and the resisting torque exerted upon the stator is increased to prevent any material change in its speed, and since the rotor and stator maintain their synchronous speed relation, the rotor does not slow down nor the stator speed up under increased load.

Should the load upon the rotor decrease, the rotor tends to speed up and the stator to slow down, but as the field 41 and consequently the resisting torque of the machine 37 is proportionately weakened, the speeds of the rotor and stator are held substantially constant.

If it is desired to decrease the speed of the rotor 31, the field 42 of the machine 38 will be strengthened, whereby the flow of current through the armatures of the machines 34 and 38 will be temporarily decreased. Since the armature current is decreased, the resisting torque exerted by the machine 34 is decreased and the stator 32 will speed up as it develops a larger torque than that applied by the machine 34. Thus the stator speeds up until the armature current of the machines 34 and 38 is increased to a value at which the resisting torque of the machine 34 again balances that transmitted by the stator. Conversely, the rotor speed is increased by weakening the field 42, the rotor approaching synchronous speed upon continued weakening of the field and running at approximately synchronous speed when the field 42 is entirely cut out.

When it is desired to cause the rotor 31 to operate above synchronous speed, the stator 32 must be rotated in the same direction as the rotor 31 and at a speed proportionate to the desired increase. This is accomplished by reversing the fields 41 and 42 of the machines 34 and 38 respectively, whereby the machine 34 is caused to operate as a motor and the machine 38 as a generator. It is to be noted that when the rotor 31 is operating below synchronous speed, and it is desired to operate the rotor above synchronous speed, the field 42 will first be weakened to such an extent that the machine 34 is brought either to a standstill or practically to a standstill. The switches 49 and 49a may then be reversed so as to cause the fields 41 and 42 to be reversed whereby the machine 34 is caused to rotate as a motor in the opposite direction and the machine 38 is caused to operate as a generator. Mechanical energy is thus taken from the shaft 39 of the synchronous motor, converted into electrical energy, and utilized to rotate the stator. By strengthening the field 42, the machine 34, operating as a motor, and consequently the stator and the rotor are caused to rotate at higher speeds, and conversely by weakening the field 42, the rotor is caused to rotate at lower speeds. Should the load increase and the motor 30 thus tend to slow down, the strength of the field 41, as has been pointed out, likewise increases, but in this case weakens the total field strength of the machine 34, operating as a motor, since the current flow through the field has been reversed. Thus, the speed of the motor 34 and that of the stator and rotor will be increased proportionately. Conversely, a decrease in load decreases the strength of the field 41 proportionately whereby the total field strength of the machine 34 is increased, and the speed of the motor 34 is proportionately decreased whereby the stator retains its constant speed even though the rotor under its relieved load tends to speed up.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States is:

1. In combination, an alternating current motor having rotatable field and armature members, one of said members being arranged for connection to a load for driving the same, means for controlling the speeds of said members so that said one member can be operated at preselected absolute speeds both above and below synchronous speed and means responsive to a motor operating condition for controlling said speed controlling means so that the selected absolute speed of said one member is maintained substantially constant.

2. In combination, an alternating current motor having rotatable field and armature members, one of said members being arranged for connection to a load for driving the same, means for controlling the speed of the other of said members so that said one member can be operated at preselected absolute speeds either above or below synchronous speed and means responsive to a motor operating condition for regulating said speed controlling means so that the selected absolute speed of said one member is maintained substantially constant.

3. In combination, an alternating current motor having rotatable field and armature members, one of said members being arranged for connection to a load for driving the same, an electric generator operably connected to the other of said members for regulating the speeds of said members so that the absolute speed of said one member can be adjusted to values both above and below synchronous speed and means responsive to the motor load for controlling said electric generator so that the adjusted absolute speed of said one member is maintained substantially constant.

4. In combination, a synchronous motor having rotatable field and armature members, one of said members being arranged for connection to a load for driving the same, speed responsive means driven by the other of said members for exerting a braking torque to regulate the absolute speed of said one member and means responsive to the motor load for regulating said speed responsive means so that said absolute speed is maintained substantially constant.

5. In combination, a synchronous motor having rotatable field and armature members, one of said members being arranged for connection to a load for driving the same, and means operably connected to said other member and responsive to the current in said armature member for maintaining the motor speed substantially constant.

6. In combination, a synchronous motor having rotatable field and armature members, one of said members being arranged for connection to a load for driving the same, and a dynamo electric machine operably connected to the other of said members and responsive to the current in the armature circuit of said motor for regulating the absolute speed of said one member whereby it is maintained substantially constant.

7. In combination, an alternating current motor having rotatable field and armature members, one of said members being arranged for connection to a load for driving the same, a dynamo electric machine operably connected to the other of said members, means for operating said machine either as a motor or as a generator whereby said first member may be operated at absolute speeds either above or below synchronous speed, and means responsive to the current in the armature circuit of said motor for controlling said dynamo electric machine to maintain the operating speed of said first member constant.

8. In combination, a synchronous motor having rotatable field and armature members, one of said members being arranged for connection to a load for driving the same, a dynamo electric machine operably connected to said other member and a dynamo electric machine operably connected to said first member, said machines being electrically connected to each other, means for controlling said machines whereby the speed of said motor may be adjusted, and means responsive to the current in the armature circuit of said motor for regulating one of said machines to maintain the speed of said motor constant at any adjusted speed.

9. In combination, a synchronous motor having rotatable field and armature members, one of said members being arranged for connection to a load for driving the same, means for controlling the other of said members whereby said one member may be operated at preselected absolute speeds either above or below synchronous speed and means responsive to the current in said armature member for controlling said speed controlling means so that the selected absolute speed of said one member is maintained substantially constant.

10. In combination, a synchronous motor having rotatable field and armature members, one of said members being arranged for connection to a load for driving the same, means for controlling the other of said members whereby said one member may be operated at preselected absolute speeds either above or below synchronous speed, means responsive to the current in said armature member for controlling said speed controlling means so that the selected absolute speed of said one member is maintained substantially constant and means for utilizing the rotative energy of said other member.

In witness whereof, I have hereunto set my hand this 23rd day of April, 1928.

LEONID A. UMANSKY.